PULSE DISCRIMINATION CIRCUIT

Filed March 27, 1967 2 Sheets-Sheet 1

INVENTORS.
CONSTANTINE S. ANANIADES
KENNETH D. KROSSA
BY
Christie, Parker & Hale
ATTORNEYS.

INVENTORS.
CONSTANTINE S. ANANIADES
KENNETH D. KROSSA
BY
Christie, Parker & Hale
ATTORNEYS.

United States Patent Office 3,482,170
Patented Dec. 2, 1969

3,482,170

PULSE DISCRIMINATION CIRCUIT

Constantine S. Ananiades, Pasadena, and Kenneth D. Krossa, Sierra Madre, Calif., assignors to Burroughs Corporation, Detroit, Mich., a corporation of Michigan Filed Mar. 27, 1967, Ser. No. 626,321
Int. Cl. H03k 5/20
U.S. Cl. 328—116 8 Claims

ABSTRACT OF THE DISCLOSURE

A time-varying threshold level signal is applied to one input of a differential comparator while a binary signal to be discriminated is applied to the other input. Preferably, the threshold level conforms to the wave form representing one of the values of the binary signal. In this way, a maximum time-amplitude product for the differential comparator can be obtained. Several exemplary embodiments for generating time-varying threshold levels are disclosed.

BACKGROUND OF THE INVENTION

This invention relates to pulse discrimination and, more particularly, to circuitry especially suitable for use in the recovery of binary information from core memories.

In recovering binary information from core memories, it is common practice to discriminate both as to signal amplitude and as to time. A marked improvement in the signal-to-noise ratio of the recovered signal is effected by such a double discrimination. A copending application of Charles P. Gerrard, Ser. No. 587,089, filed Oct. 17, 1966, entitled "Pulse Discrimination Circuit," and assigned to the assignee of the present application, discloses and claims circuitry for combining time and amplitude discrimination into a single operation. As a result, the variable time delays inherent in amplitude discrimination do not disturb the phase relationship between the signal to be discriminated and the strobe pulses employed in the time discrimination. Specifically, a differential comparator is provided having two inputs and an output that is capable of assuming one of two states, depending upon the relative amplitude of the signals applied to the two inputs. The binary signal to be discriminated is coupled to one input, while a signal sufficient in amplitude to hold the output of the differential comparator in a first state is normally coupled to the other input. Upon the appearance of strobe pulses, a constant amplitude signal representing a threshold level is coupled to the other input. If the binary signal to be discriminated does not exceed this threshold level during the strobing interval, a binary "0" is indicated and the output of the differential comparator remains in the first state. If the threshold level is exceeded during the strobing interval, a binary "1" is indicated and the output of the differential comparator assumes a second state. From the point of view of reliability, it is desirable in amplitude discrimination to establish a low threshold level so the difference between the threshold level and the amplitude of the binary signal representing the binary "1" is as large as possible. Likewise it is desirable in time discrimination to employ long strobe pulses so the intervals of time over which the binary signal is sampled are as large as possible. In other words, the product of the strobing interval times the amplitude difference between the binary "1" and the threshold level should be as large as possible. This product represents the energy available for driving the circuitry that determines the output state of the differential comparator. Under some circumstances, the desire to make the strobing interval as large as possible and the threshold level as low as possible work against each other. Thus in such cases, as the threshold level is lowered, the strobing interval must of necessity be shortened in order to discriminate accurately between the two values of the binary signal. Conversely, as the strobing interval is lengthened, the threshold level must of necessity be raised to discriminate accurately. Consequently, for any given circuit arrangement and characteristics of a binary signal to be discriminated, an upper limit on the time-amplitude product exists.

SUMMARY OF THE INVENTION

According to the invention, the threshold level used to discriminate binary signals is varied as a function of time to hold it continuously at the most advantageous value. Preferably, the threshold level conforms to the wave form representing the value of the binary signal for which no change in the output state of the differential discriminator takes place. Commonly, this wave form follows an exponential path. In such case, the threshold level can be produced by means of a simple resistance-capacitance or resistance-inductance network. By varying the threshold level as a function of time, the difference between the binary value of the binary signal for which the output state of the differential comparator is to change and the threshold level is increased. As a result, the time-amplitude product is expanded.

If time discrimination is utilized in addition to amplitude discrimination, the use of a time-varying threshold as described in the preceding paragraph permits a longer strobing interval in many cases. The source of strobe pulses itself can be utilized to produce the threshold level, thereby insuring a proper time correspondence between the strobing interval and the variations of the threshold level.

A feature of the invention permits sharing of a single threshold level generator by a plurality of pulse discrimination circuits, with adjustment for the pulse discrimination circuits being effected by variable resistors individual to each discrimination circuit.

BRIEF DESCRIPTION OF THE DRAWINGS

The features of specific embodiments of the invention are illustrated in the drawings, in which.

DETAILED DESCRIPTION OF SPECIFIC EMBODIMENTS

Figure 1:
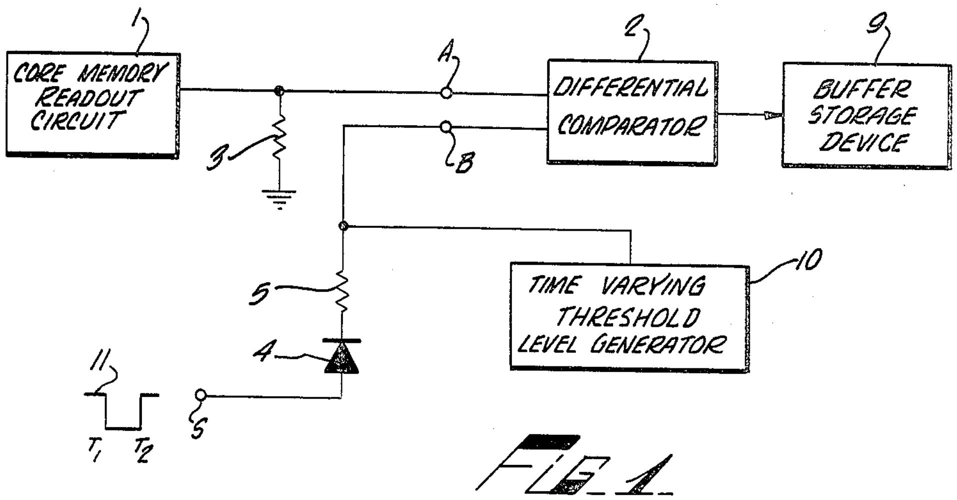
FIG. 1 is a schematic diagram partially in block form of a pulse discrimination circuit embodying the principles of the invention.

The circuit arrangement shown in FIG. 1 is identical to that disclosed in the above-mentioned Gerrard application except for the replacement of a battery providing a constant threshold level with a time-varying threshold level generator designated 10. A core memory read-out circuit 1, which produces binary signals to be discriminated, is coupled to an input terminal A of a differential comparator 2. A resistor 3 is connected between the output of circuit 1 and ground. A terminal S, to which strobe pulses are applied, is connected by a diode 4 and a resistor 5 to an input terminal B of differential comparator 2. The strobe pulses are derived from a master clock that also controls the recovery of information from the core. Consequently, the strobe pulses bear a fixed predetermined phase relationship to the signal to be discriminated. The threshold level for the signal to be discriminated is determined by the output of generator 10.

Differential comparator 2, which is a commercially available circuit, has an output that assumes one of two states, for example, a binary "1" or "0," depending upon the relative amplitude of the signals applied to terminals A and B. If terminal A becomes positive with respect to terminal B, the output of differential comparator 2 would assume, for example, a "1" state. Otherwise, it would remain in a "0" state as long as terminal A is negative with respect to terminal B. The output of differential comparator 2 is coupled to a buffer storage device 9 which could, for example, produce a pulse of fixed duration each time the output of differential comparator 2 assumes the "1" state.

The mode of operation of the pulse discrimination circuit of FIG. 1 in the course of a strobing cycle is now considered. As indicated by a wave form designated 11, prior to a time $T_1$, a positive voltage is impressed on terminal S. This voltage is sufficient in amplitude to forward-bias diode 4. Resistor 5 is selected to be of such value that the resulting signal at terminal B is larger than the maximum amplitude that the signal at terminal A attains. As a result, terminal A is always negative with respect to terminal B outside of the strobing interval, i.e., time $T_1$ to $T_2$, and the output of differential comparator 2 remains in the "0" state. At the beginning of the strobing interval, i.e. time $T_1$, the signal at terminal S drops sufficiently to back-bias diode 4. Thus, the signal applied to terminal B is that representing the threshold level produced by generator 10. If the signal applied to terminal A during the strobing interval exceeds this threshold level, the output of differential comparator 2 changes to the "1" state. Otherwise, the output of differential comparator 2 remains in the "0" state during the strobing interval.

Figure 5:
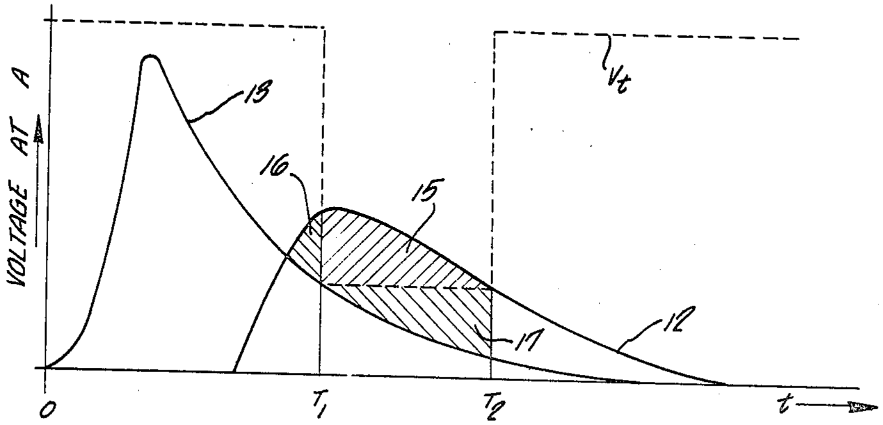
FIG. 5 is a graph of typical wave forms of a binary signal in relationship to a constant threshold level.
Figure 6:
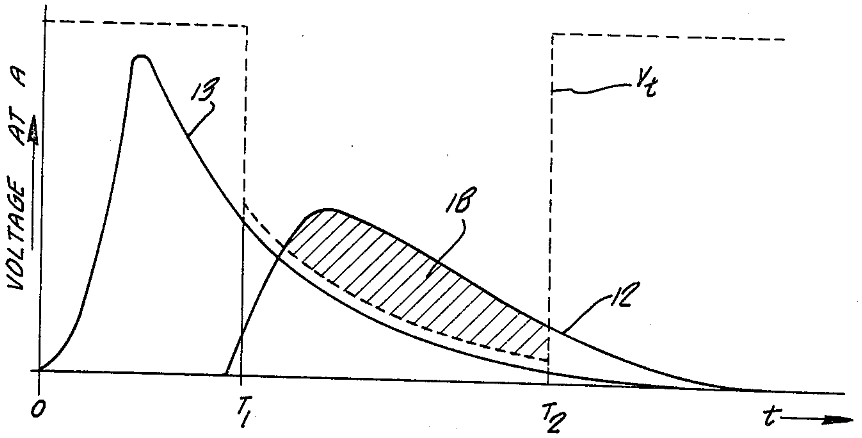
FIG. 6 is a graph of typical wave forms of a binary signal in relationship to a time-varying threshold level as contemplated by the invention.

Reference is now made to FIGS. 5 and 6, which are graphs of the voltage at terminal A as a function of time. A wave form 12 represents the value of the binary signal for which the output of differential comparator 2 is to change to the "1" state; a wave form 13 represents the value of the binary signal for which the output of differential comparator 2 is to remain in the "0" state; the dashed line labeled $V_t$ represents the threshold level applied to terminal B; and the vertical lines labeled $T_1$ and $T_2$ designate the strobe interval. The binary signal is affected by noise and may also vary in phase relative to the strobe pulses. Wave form 12 actually designates the minimum amplitude of the one binary value and wave form 13 designates the maximum amplitude of the other binary value. In other words, these wave forms represent a "worst case" situation that depends on the particular system in which the binary signal appears.

In FIG. 5, the threshold level is constant, as shown by the fact that line $V_t$ is horizontal within the strobing interval. The product of the strobing interval times the amplitude difference between wave form 12 and the threshold level is represented by a shaded area 15. When the threshold level is lowered in an attempt to increase area 15, the strobing interval, $T_1$ to $T_2$, must be shortened to insure that wave form 13 remains below the threshold level during the entire strobing interval. Conversely, when the strobing interval is increased, the threshold level must be raised to insure that wave form 13 remains below the threshold level during the entire strobing interval. Shaded areas 16 and 17 represent potential increases in the time-amplitude product that are not utilized by selecting a constant threshold level.

The invention contemplates the use of a time-varying threshold level that permits full utilization of the potential time-amplitude product. Most advantageously, the threshold level conforms to wave form 13 during the strobing interval, remaining above and as close as practicable to wave form 13. This is illustrated in FIG. 6. Thus, the full area between wave forms 12 and 13 is utilized, which signifies that the maximum possible energy is available for switching the output state of differential comparator 2. As discernible from a comparison of FIGS. 5 and 6, a properly selected time-varying threshold level permits both the lengthening of the strobing interval and the lowering of the threshold level to include both shaded areas 16 and 17 within the time-amplitude product, represented in FIG. 6 by shaded area 18.

The invention could also be employed without time discrimination, in which case the threshold level would most advantageously follow wave form 13 continuously.

Figure 2:
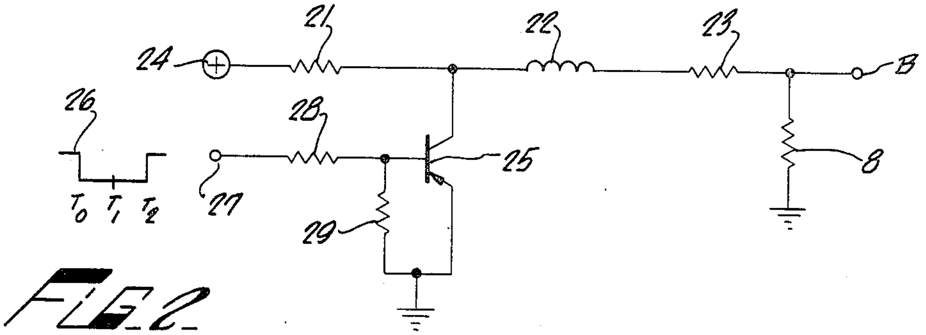
FIG. 2 is a schematic circuit diagram of one embodiment of the time-varying threshold level generator shown in block form in FIG. 1.
Figure 3:
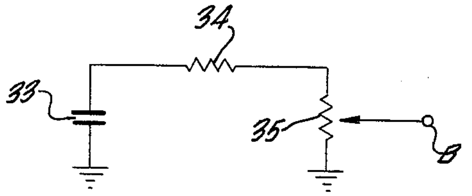
FIG. 3 is a schematic circuit diagram of another embodiment of the time-varying threshold level generator shown in block form in FIG. 1.
Figure 4:
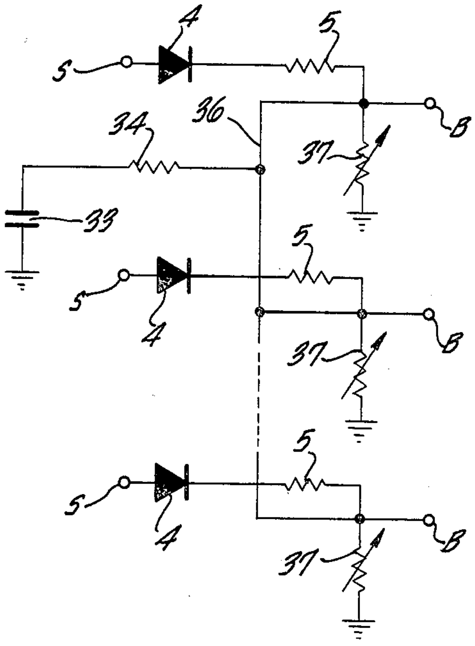
FIG. 4 is a schematic circuit diagram of an arrangement in which a single time-varying threshold level generator is shared by a plurality of different pulse discrimination circuits.

Typically, the shape of the binary signal to be discriminated is such that the threshold level varies exponentially in conforming to the one value. Such is the case with the wave forms illustrated in FIGS. 5 and 6. FIGS. 2, 3, and 4 depict various embodiments of a threshold level generator for generating exponential signals. Other, more complex shapes could be constructed by employing the principles of circuit synthesis.

In FIG. 2, a resistor 21, an inductor 22, and a resistor 23 are connected in series between a source 24 of positive potential and terminal B of differential comparator 2. A resistor 8 is coupled bestween terminal B and ground. The collector of a transistor 25 is connected to the junction of resistor 21 and inductor 22. The emitter of transistor 25 is connected directly to ground. A pulse signal synchronized to the strobe pulse, represented by a wave form 26, is applied to a terminal 27. Terminal 27 is coupled to the base of transistor 25 by a resistor 28, and a resistor 29 is coupled between the base of transistor 25 and ground. Prior to time $T_0$ in the strobe cycle, a positive signal is applied to terminal 27 and transistor 25 is cut off. At time $T_0$, a negative pulse is applied to terminal 27, transistor 25 is driven into saturation, and the junction between resistor 21 and inductor 22 drops substantially to ground potential. As a result, the current passing through inductor 22 starts to decay exponentially. Before the direction of current flow through inductor 22 changes, the strobe pulse begins at time $T_1$. This back-biases diode 4 and unclamps terminal B from the voltage determined by the potential at terminal S. In the strobing interval between times $T_1$ and $T_2$, the current through inductor 22 decays exponentially toward zero with a time constant dependent upon the values of inductor 22, resistor 23, and resistor 8. The described circuit parameters are selected so the threshold level, which is the voltage drop across resistor 8, is directly above wave form 13 at time $T_1$ and follows an exponential decay lying directly above wave form 13 for the entire strobing interval. At time $T_2$, the strobe pulse at terminal S ends and diode 4 becomes forward-biased once again. The termination of pulse 26 can be advanced or delayed with respect to the termination of pulse 11 in order to avoid or minimize the effects of any extraneous noise pulses arising from the switching of various circuits.

In FIG. 3, a simplified shaping circuit is shown that is composed exclusively of passive circuit elements. A capacitor 33, a resistor 34, and a potentiometer 35 are connected one to the other. Terminal B is connected to the slider arm of potentiometer 35. Prior to the strobing interval, capacitor 33 charges up to the potential at terminal B, which is primarily determined by the potential at terminal S and the position of the slider arm of potentiometer 35. At time $T_1$, diode 4 becomes back-biased and capacitor 33 discharges through resistor 34 and potentiometer 35 to ground. The time constant depends upon the values of capacitor 33, resistor 34, and potentiometer 35. The initial threshold voltage from which the exponential decay starts is adjusted by varying the position of the slider arm of potentiometer 35.

FIG. 4 illustrates how capacitor 33 and resistor 34 can be adapted to serve a plurality of different pulse discrimination circuits, providing a time-varying threshold level to each one. Resistor 34 is connected to a common bus 36 that feeds terminal B of each of the pulse discrimination circuits. Variable resistors 37 provide individual adjustment for the pulse discrimination circuits, both as to the initial threshold level at time $T_1$ and the time constant with which the threshold level decays.

We claim:

1. A pulse discrimination circuit comprising: a source of binary signals characterized by a first wave form representative of one binary value and a second wave form representative of the other binary value; means during at least a portion of each repetition of the binary signal for producing a time-variable threshold level lying between the first and second wave forms of the binary signal; and means for detecting when the binary signal exceeds the threshold level.

2. The pulse discrimination circuit of claim 1, in which the threshold level conforms to the first wave form and the detecting means has an output that normally remains in a first state and changes to a second state when the binary signal exceeds the threshold level.

3. A pulse discrimination circuit comprising: a differential comparator having first and second input terminals and an output terminal that assumes either a first state or a second state depending upon the relative amplitude of the signals applied to the first and second input terminals; a source of binary signals connected to the first input terminal, the binary signals being characterized by a first wave form representative of one binary value and a second wave form representative of the other binary value; and a threshold level generator connected to the second input terminal of the differential comparator, the generator producing a threshold level that varies during at least a portion of each repetition of the binary signal as a function of time between limits corresponding to the first and second wave forms of the binary signal.

4. The pulse discrimination circuit of claim 3, in which the threshold level follows the first wave form.

5. The pulse discrimination circuit of claim 3, in which means are provided for producing a signal that overrides the signal produced by the threshold level generator at the second terminal of the differential comparator, the overriding signal being larger than the maximum value that the binary signal applied at the first input terminal attains, and means are provided for removing the overriding signal from the second input terminal responsive to periodic strobe pulses.

6. The pulse discrimination circuit of claim 5, in which the threshold level generator comprises: a source of bias potential, a resistor, and an inductor connected in series between the source and the second input terminal; a switch capable of grounding one side of the inductor to cause the current therein to discharge exponentially through the resistor; and means for operating the switch from a time prior to each strobe pulse until the end of each strobe pulse.

7. The pulse discrimination circuit of claim 5, in which the threshold level generator comprises: a capacitor; a resistor; and a potentiometer with a slider arm connected one to the other in a closed path, the slider arm of the potentiometer being connected to the second input terminal.

8. A circuit arrangement comprising: a plurality of sources of binary signals to be discriminated; a differential comparator corresponding to each source of binary signals, the differential comparator having first and second input terminals and an output terminal that assumes one of two states depending upon the relative amplitudes of the signals applied to the first and second input terminals; means for connecting each source of binary signals to one input terminal of its corresponding differential comparator; a single threshold level generator comprising the combination of a resistor and a capacitor in series; a common bus for connecting the threshold level generator to the second input terminal of each differential comparator; variable resistors individual to each binary signal coupled across the second input terminal of the respective differential comparators; and means for providing an overriding signal at the second terminal of the differential comparator corresponding to each binary signal source in the absence of strobe pulses.

References Cited

UNITED STATES PATENTS

| | | | |
|---|---|---|---|
| 3,248,570 | 4/1966 | Gaunt | 307—235 |
| 3,253,155 | 5/1966 | Randall | 328—151 |
| 3,267,440 | 8/1966 | Piening | 307—232 |

DONALD D. FORRER, Primary Examiner

D. CARTER, Assistant Examiner

U.S. Cl. X.R.

307—232, 235, 261, 263; 328—109

Disclaimer 3,482,170.—*Constantine S. Ananiades*, Pasadena, and *Kenneth D. Krossa*, Sierra Madre, Calif. PULSE DISCRIMINATION CIRCUIT. Patent dated Dec. 2, 1969. Disclaimer filed Feb. 18, 1971, by the assignee, *Burroughs Corporation.*

Hereby disclaims all of the claims in said patent.

[*Official Gazette June 15, 1971.*]